United States Patent [19]

Tsuji

[11] Patent Number: 5,757,773
[45] Date of Patent: May 26, 1998

[54] MULTIPLEX DISTRIBUTED COMMUNICATION SYSTEM HAVING HIGH SLEEP MODE RESPONSIVENESS

[75] Inventor: Katsuhisa Tsuji, Hoi-gun, Japan

[73] Assignee: Denso Corporation, Kariya, Japan

[21] Appl. No.: 744,579

[22] Filed: Nov. 6, 1996

[30] Foreign Application Priority Data

Nov. 7, 1995 [JP] Japan ................... 7-288970

[51] Int. Cl.[6] ................................................. H04L 12/403
[52] U.S. Cl. ..................... 370/241; 307/10.1; 370/432; 340/825.06
[58] Field of Search ........................ 370/432, 433, 370/437, 442, 447, 449, 450, 453, 454, 457, 461, 462, 465, 496, 216, 241, 242, 245, 252; 307/10.1, 10.6; 340/825.06

[56] References Cited

U.S. PATENT DOCUMENTS

| | | | |
|---|---|---|---|
| 4,987,317 | 1/1991 | Poumain et al. | 307/40 |
| 5,351,041 | 9/1994 | Ikata et al. | 340/825.24 |
| 5,554,978 | 9/1996 | Sakagami et al. | 340/825.07 |
| 5,594,735 | 1/1997 | Jokura | 370/337 |
| 5,666,355 | 9/1997 | Huah et al. | 370/311 |
| 5,691,980 | 11/1997 | Welles, II et al. | 370/316 |

FOREIGN PATENT DOCUMENTS

| | | | |
|---|---|---|---|
| 4-292236 | 10/1992 | Japan | H04L 12/40 |
| 6-38276 | 2/1994 | Japan | H04Q 9/00 |
| 8-70312 | 3/1996 | Japan | H04L 11/00 |

*Primary Examiner*—Hassan Kizou
*Assistant Examiner*—A. Bnimoussa
*Attorney, Agent, or Firm*—Cushman Darby & Cushman IP Group of Pillsbury Madison & Sutro LLP

[57] ABSTRACT

To provide a multiplex communication system where nodes can reliably shift to a sleep state even though the system has a very simple structure and even if abnormal conditions occur in any node, multiple nodes communicate with each other through a communication network, and when the individual nodes are in a state of being unable to shift to a sleep state, they set a sleep disable bit in signals to be transmitted and transmit them. When they become able to shift to the sleep state, the individual nodes confirm that they have not yet received an active sleep disable bit sent from other nodes continuously over a predetermined period of time or more. Thereafter, each individual node proceeds to the sleep state. According to the system, the individual nodes can proceed to the sleep state by simply determining non-transmission of the sleep disable bit from other nodes even in the presence of nodes deactivated due to failures.

13 Claims, 8 Drawing Sheets

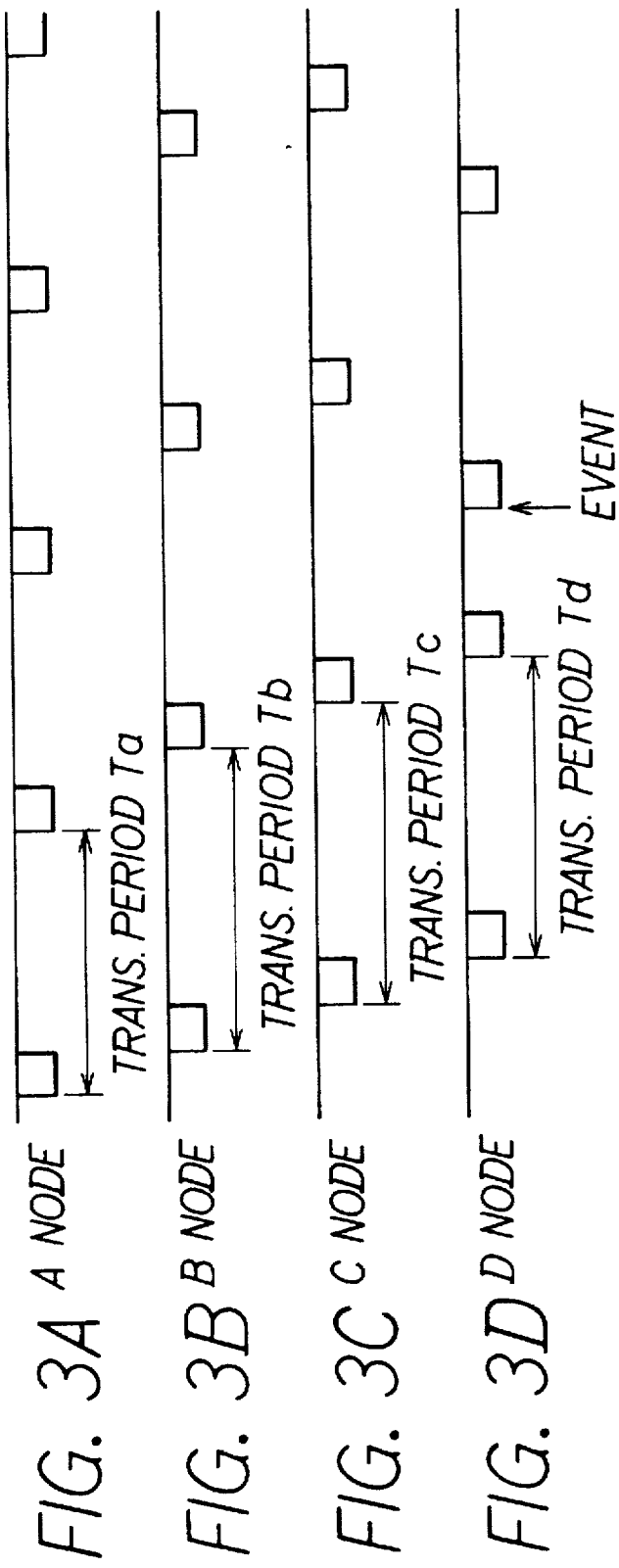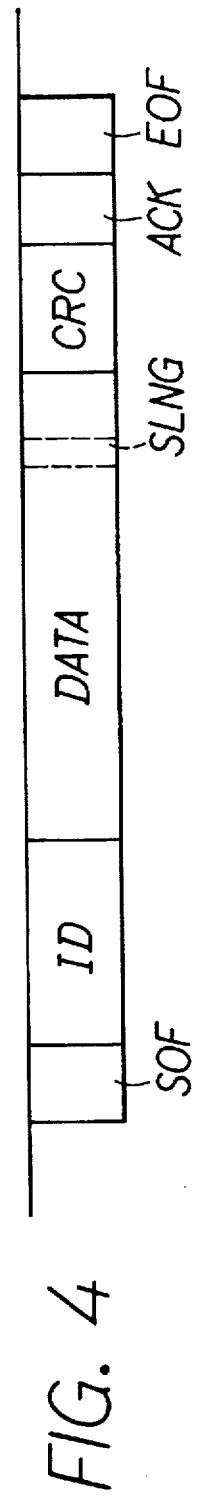

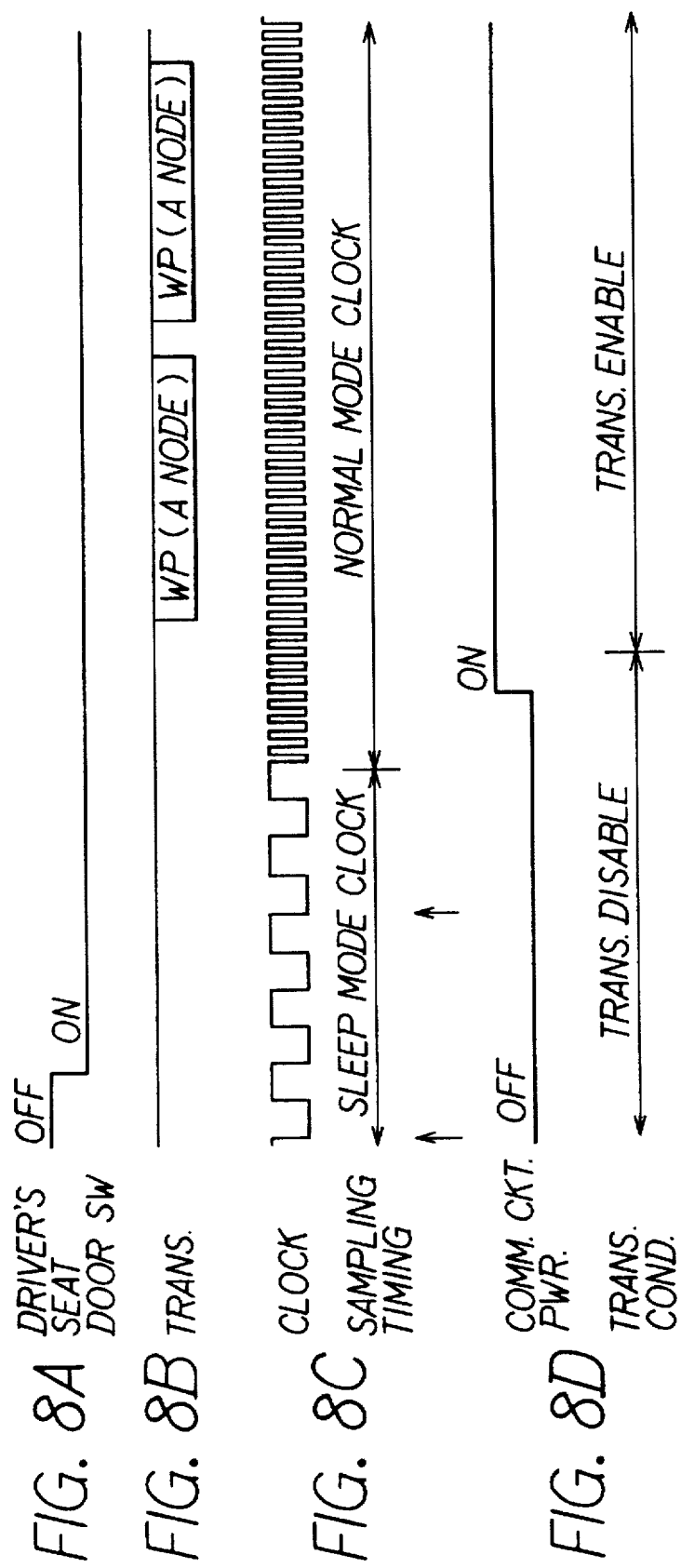

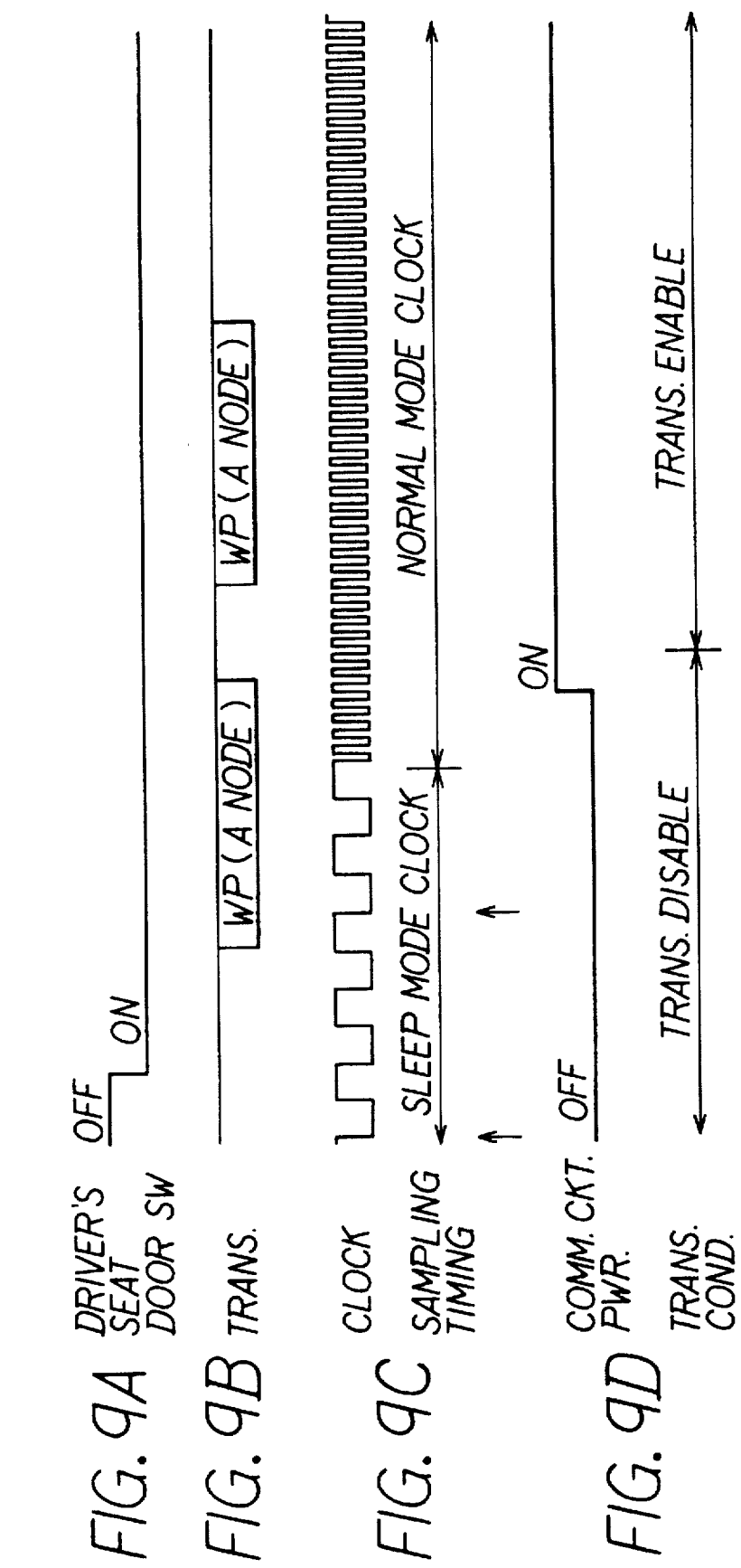

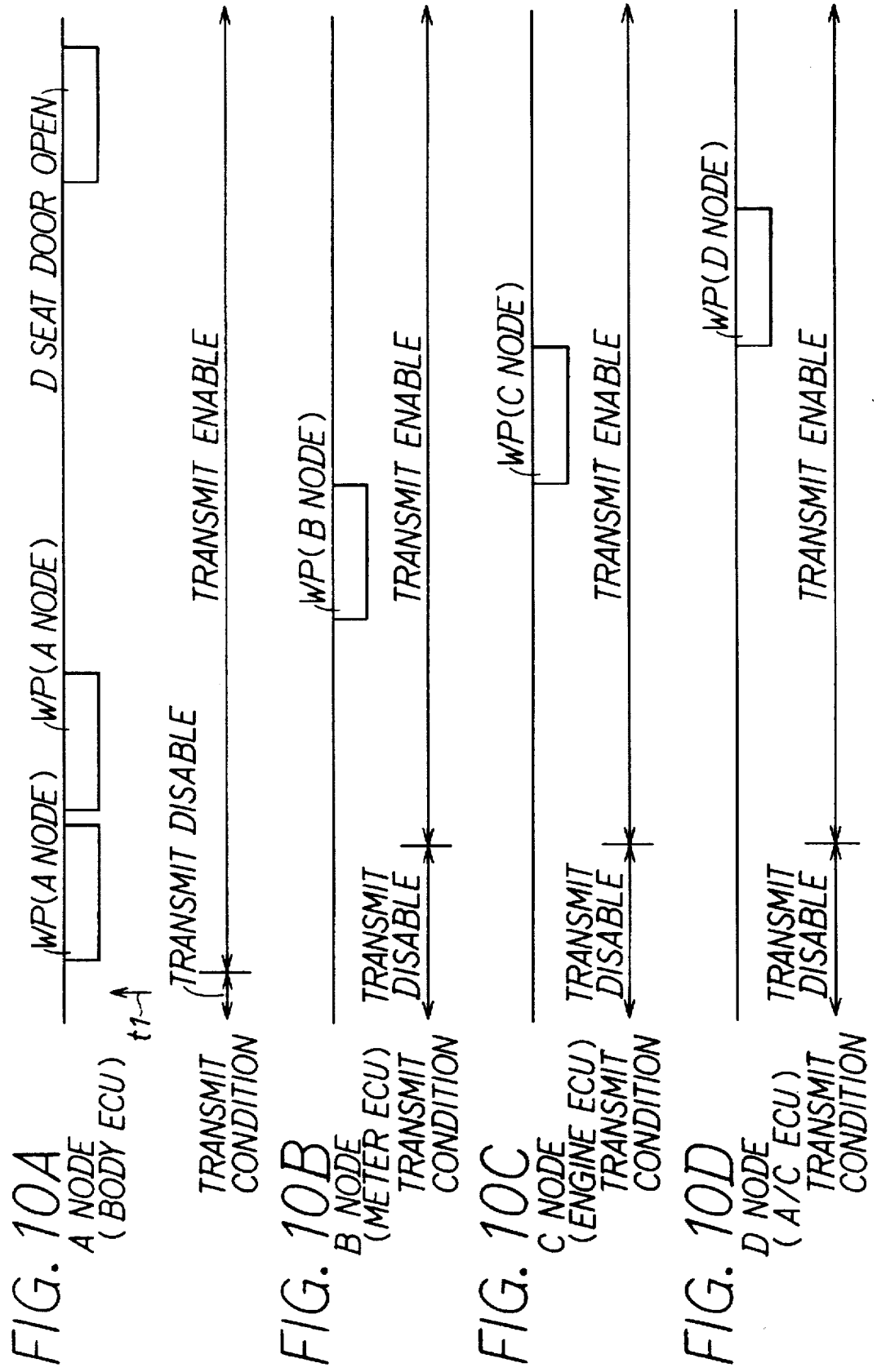

MULTIPLEX DISTRIBUTED COMMUNICATION SYSTEM HAVING HIGH SLEEP MODE RESPONSIVENESS

CROSS-REFERENCE TO RELATED APPLICATION

The present application is related to and claims priority from Japanese Patent Application No. Hei 7-288970, incorporated herein by reference.

BACKGROUND OF THE INVENTION

1. Field of the Invention

The present invention relates to a multiplex communication system where a plurality of nodes mutually transmit and receive signals through a communication network.

2. Description of Related Art

The number of electrical components or electrical units mounted in a vehicle has been increasing in recent years in accordance with high advancement and performance of the vehicle. Wiring in the vehicle has been complex and made on a massive scale. Therefore, a multiplex communication system where a plurality of devices are connected to one another through a communication network to conduct communications between the respective device has been put into practical use as means for resolving such a problem.

When such a multiplex communication system is mounted on a vehicle, for example, power depends on battery power supply when the vehicle's engine is at rest. It is thus necessary to restrain power consumption to as low a level as possible. Therefore, a proposal has been made in which, when the system stops operating, nodes corresponding to respective devices which constitute the system stop their functions and when a start request is made, the nodes enter into a so-called sleep state in which they consume only the required minimum power corresponding to the desired degree of restartability.

However, in the multiplex communication system constructed so that the respective nodes communicate with each other, there is a fear that when the nodes randomly enter into the sleep state, data sent from some node is not processed without being received by a node to receive the data therein, whereby the entire system cannot be controlled.

Therefore, a system has been disclosed in, for example, Japanese Patent Published Unexamined Application No. Hei 6-38276, where, when each of nodes constituting the system is set shiftable to a sleep state, it transmits a sleep signal for signalling its shiftable state to all other nodes and when each node receives sleep signals sent from all the communicable nodes when the node is in a state of being able to proceed to the sleep state, each node is shifted to the sleep state.

Namely, in the disclosed system referred to above, the respective nodes confirm with each other the state of being shiftable to the sleep state by transmitting the sleep signals. After all the nodes have been brought into the state of being able to enter into the sleep state, the individual nodes shift to the sleep state in unison. In the present system as well, when the respective nodes first monitor nodes which are able to communicate therewith and then receive the sleep signals sent from all the nodes determined as being communicable with the corresponding nodes, the respective nodes enter into the sleep state. Thus, even if ones that fail to properly operate due to failures or the like exist in the nodes constituting the system, the respective nodes can be reliably shifted to the sleep state.

In the above-described conventional multiplex communication system, however, the respective nodes transmit the sleep signals to advise the other nodes of the state of being able to shift to the sleep state. When the nodes that are not able to transmit the sleep signals due to their failures exist, they cannot enter into the sleep state. Therefore, countermeasures against that inconvenience are taken in which the respective nodes first monitor the nodes which are able to communicate therewith and then enter into the sleep state after they have received the sleep signals sent from all the nodes communicable with the corresponding nodes.

Thus, in the conventional multiplex communication system, the respective nodes must store therein the nodes from which the sleep signals have been transmitted. Further, they must monitor with which nodes they are able to communicate and store them therein. It is moreover necessary to execute a process for determining whether or not the corresponding nodes are able to communicate with the nodes that have not transmitted the sleep signals (they are in a transmittable state). Thus, a determining process for shifting to the sleep state and a communications procedure become complex.

Further, in the conventional system referred to above, memory means (storage region) for storing therein the nodes from which the sleep signals have been transmitted and the nodes being able to communicate with the nodes are required by the number of the nodes which constitute the system. Therefore, a problem arises that when the nodes are added to the system, the memory means must be added each time the nodes are added to the system and the determining process for the transition of the nodes to the sleep state must be changed, so that the extension of the system cannot be easily carried out.

Incidentally, a system has been disclosed in, for example, Japanese Patent Published Unexamined Application No. Hei 4-292236 wherein when a communication signal-free state continues on a communication network for a predetermined period of time, respective nodes themselves enter into a sleep state. However, such a construction can be applied to a case in which any one of a plurality of nodes is implemented as a master node for controlling the start of communications. If such a construction is applied to a system constructed so that respective nodes mutually transmit and receive signals, then the respective nodes enter into a sleep state when any of the nodes is not proper, so that the entire system can be controlled.

SUMMARY OF THE INVENTION

With the foregoing problems of the prior art in mind, it is an object of the present invention to provide a simply-structured multiplex communication system having a plurality of nodes that are able to communicate with each other, where even if one of the nodes is irregular, the respective nodes can reliably proceed to a sleep state.

The above object is achieved according to a first aspect of the present invention by providing a plurality of nodes connected to one another through a communication network and a sleep determining unit, a signalling or notifying unit and a switching unit.

The sleep determining unit makes a decision as to whether or not an operating state of its own node can be shifted to a sleep state having less power consumption than a normal state. When it is determined by the sleep determining unit that the corresponding node is not able to shift to the sleep state, the notifying unit transmits a signaling signal for notifying all other nodes of the result of determination referred to above by the sleep determining unit. Further, the switching unit switches the operating state of its own node to the sleep state when it is determined that the signaling signals sent from other nodes are not continuously received for a predetermined time interval or more where the sleep determining unit determines that the corresponding node is able to shift to the sleep state.

When the respective nodes reach the state in which they themselves can shift to the sleep state, they stop the transmission of the signaling signals. If they do not receive the signaling signals sent from other nodes for the predetermined period of time or more in this condition, it is determined that all the nodes including themselves have reached the state of being able to proceed to the sleep state, whereby their own operating states are changed from the normal state to the sleep state under the operation of the switching unit.

Preferably, the switching unit changes the operating state of its own node to the sleep state when it is determined that the signaling signals sent from other nodes are not continuously received by the node for the predetermined time interval or more where the sleep determining unit determines that the corresponding node is able to shift to the sleep state, and thereafter when it is determined by the sleep determining unit that the corresponding node is capable of shifting to the sleep state and when it is determined whether the state of non-reception of the signaling signals sent from other nodes by the corresponding node has continued for the predetermined time interval or more and it is determined that the state has continued for the predetermined time interval or more.

Preferably, at least one of the plurality of nodes includes a start condition determining unit and a first starting unit in the multiplex communication system. The start condition determining unit determines whether predetermined start conditions for starting the system have been established when its own node is in the sleep state. If it is determined by the start condition determining unit that the start conditions have been established, the first starting unit switches the operating state of its own node from the sleep state to the normal state and transmits twice a start signal for notifying a startup of its own node to all other nodes.

Further, all nodes including the corresponding node respectively include a start signal detecting unit, second starting unit and a transmit permitting unit. The start signal detecting unit detects that the start signal has been transmitted from each of other nodes when its own node is in the sleep state. When the transmission of the start signal is detected by the start signal detecting unit, the second starting unit switches the operating state of its own node from the sleep state to the normal state to transmit the start signal. Further, the transmit permitting unit allows the operation of transmission of a desired signal from its own node when it is determined that the node has received start signals sent from all other nodes after the operating state of the node has been switched from the sleep state to the normal state.

Also preferably, the transmit permitting unit provided for each node in the multiplex communication system permits the operation of transmission of the desired signal from its own node regardless of conditions of the start signals received from other nodes when the predetermined time interval has elapsed after the operating state of its own node has been changed from the sleep state to the normal state.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 3A-3D are timing diagrams showing the states of transmission of the respective nodes shown in FIG. 2;

FIG. 4 is a diagram showing a signal transmitted by each node;

FIGS. 8A-8D are timing diagrams showing the operation of an A node (body ECU) at the time that a door on the driver's seat side of a vehicle in which the embodiment is installed is opened when all the nodes are kept in a sleep state;

FIGS. 9A-9D are timing diagrams showing the operation of each of nodes other than the A node at the time that the door on the driver's seat side is opened when all the nodes are kept in the sleep state; and FIGS. 10A-10D are timing diagrams showing the operation of returning of each node From the sleep state to the normal state.

DETAILED DESCRIPTION OF THE PRESENTLY PREFERRED EXEMPLARY EMBODIMENTS

A preferred embodiment of the present invention will hereinafter be described with reference to the accompanying drawings.

Figure 1:
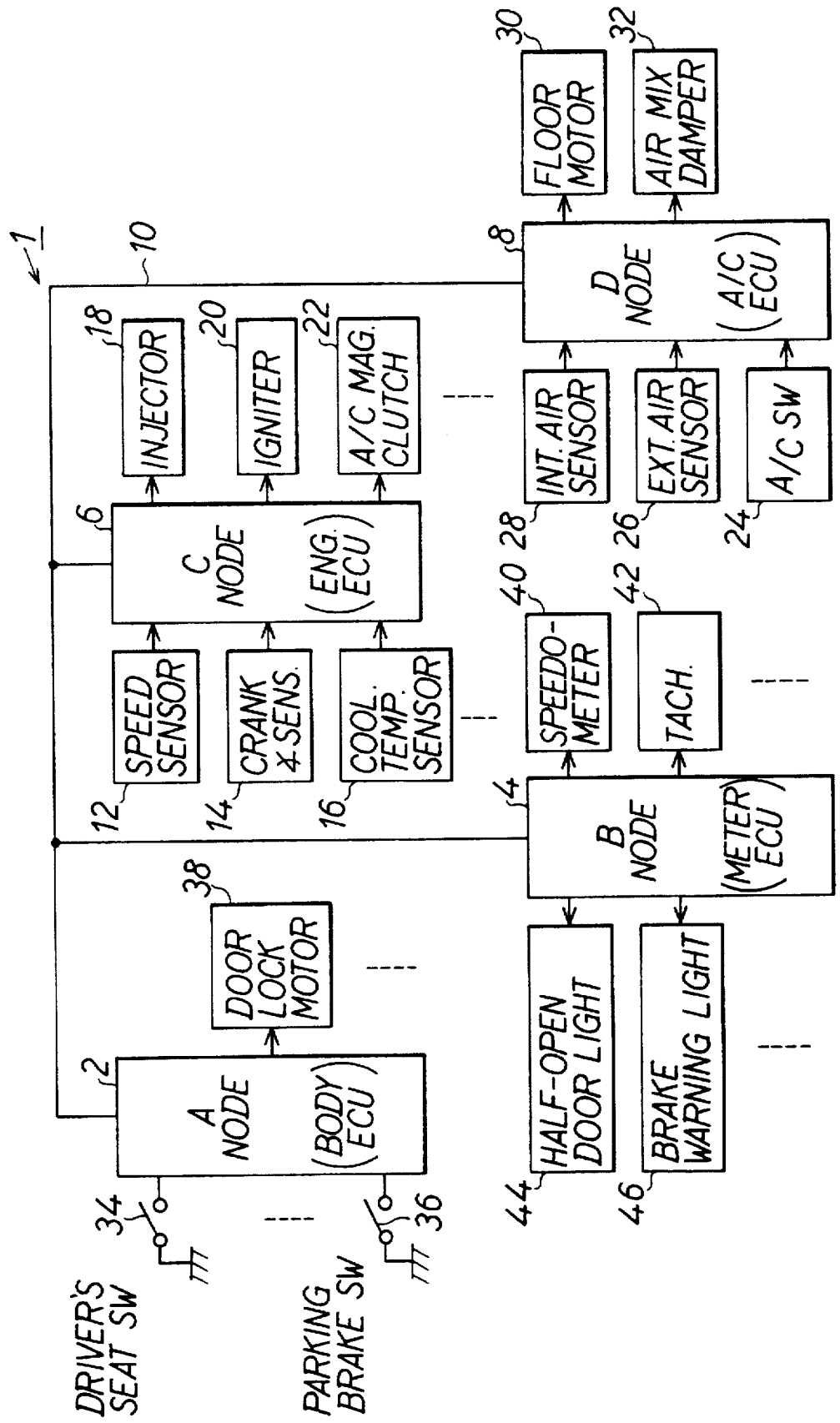
FIG. 1 is a diagram showing the configuration of a multiplex communication system according to a preferred embodiment of the present invention.

FIG. 1 is a diagram showing the configuration of a multiplex communication system 1 according to the embodiment. The multiplex communication system 1 according to this embodiment controls an engine, an air conditioner, meters and other electrical components mounted on a vehicle.

As shown in FIG. 1, the multiplex communication system 1 has an A node 2 which is a controller (hereinafter called "body ECU") for controlling various electrical components such as an automatic door lock, a power window, etc., a B node 4 which is a controller (hereinafter called "meter ECU") for controlling instruments and warning or alarm lights in a meter panel, a C node 6 which is a controller (hereinafter called "engine ECU") for controlling the engine, and a D node 8 which is a controller (hereinafter called "air conditioner ECU") for controlling the air conditioner. The four nodes 2, 4, 6 and 8 are connected to one another through a multiplex communication network (hereinafter called "communication network") 10 and serially communicate with each other.

The C node (engine ECU) 6 detects a state of driving or operation of a vehicle based on signals detected from various sensors such as a vehicle speed sensor 12 for detecting the speed of the vehicle, a crank angle sensor 14 for detecting the number of revolutions of the engine per predetermined time unit (hereinafter called merely "engine speed") and a coolant temperature sensor 16 for detecting a cooling water temperature (hereinafter called merely "water temperature") of an engine, etc. The C node 6 drives an injector 18, an igniter 20 and the like based on the result of detection to thereby maintain the engine in an optimum operating state.

Further, the C node 6 transmits data indicative of operating states such as the vehicle speed, engine speed and water temperature or the like detected as described above and activates an A/C magnet clutch 22 in response to an air conditioner control signal sent from the D node (air conditioner ECU) 8 as will be described later to transfer a driving force of the engine to a coolant compressor of the air conditioner, thereby enabling the operation of cooling by the air conditioner.

On the other hand, when an air conditioner switch 24 is turned on by a vehicle driver or the like, the D node (air conditioner ECU) 8 transmits the aforementioned air conditioner control signal to the C node 6 to activate the A/C magnet clutch 22. The D node 8 detects the vehicle's inside and outside temperatures based on signals detected by an outside air sensor 26 and an inside air sensor 28. Further, the D node 8 drives an air blower motor 30, an air mix damper 32 or the like for changing the distribution of air in response to the result of detection and the data indicative of the vehicle speed, engine speed and water temperature sent from the C node 6 to thereby control air conditioning in the vehicle's interior. On the other hand, the A node (body ECU) 2 further receives therein a signal input from a driver's seat door switch 34 turned on when the door on the driver's seat side is opened, signals input from respective door switches respectively turned on/off in response to the opening and closing of the respective vehicle doors, and a signal input from a parking brake switch 36 or the like turned on when a vehicle's parking brake is pulled up, and sends switch signals respectively indicative of on/off states of the respective switches.

Moreover, the A node 2 drives a door lock motor 38 according to the operation of a door lock switch (not shown) to thereby control the locking and unlocking of the door. When the vehicle speed is greater than or equal to a predetermined value, the A node 2 drives the door lock motor 38 based on the data indicative of the vehicle speed sent from the C node 6 to thereby automatically lock the door.

The B node (meter ECU) 4 drives a speed meter 40, a tachometer 42 and a water temperature meter (not shown) or the like in the meter panel in response to the data indicative of the vehicle speed, engine speed and water temperature or the like sent from the C node 6. Further, the B node 4 causes a half-open door warning light 44 indicative of the opening of the door, a brake warning light 46 indicative of the pulling up of the parking brake, etc. to light up in response to various switch signals sent from the A node 2.

Figure 2:
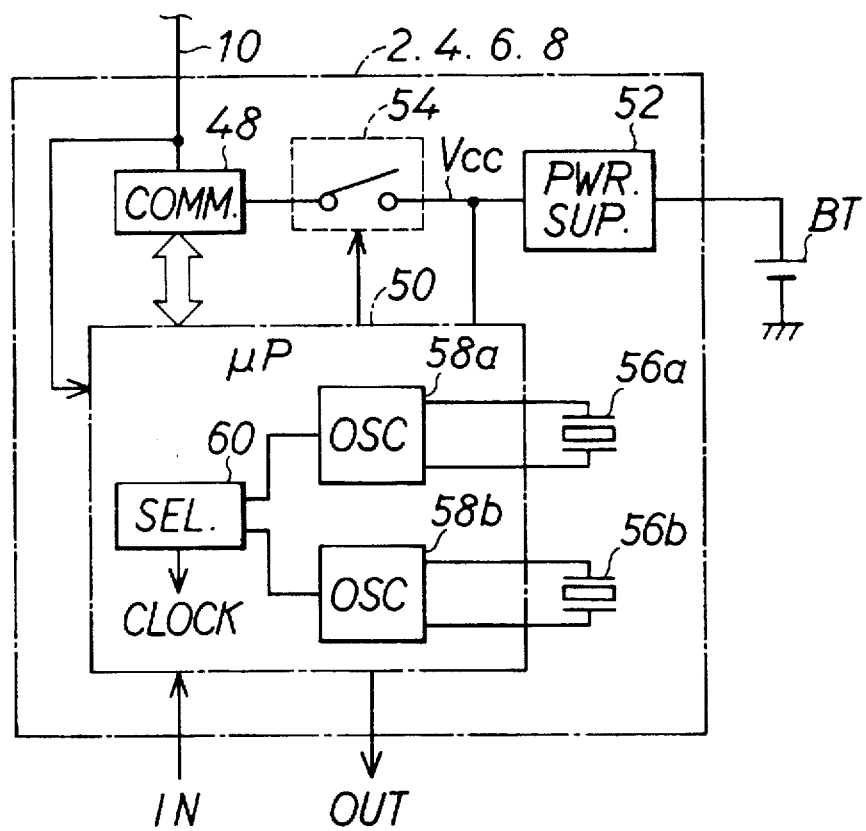
FIG. 2 is a block diagram showing an internal configuration of each of the nodes which constitute the multiplex communication system.

The above-described nodes 2, 4, 6 and 8 respectively have an internal configuration shown in FIG. 2.

Namely, each of the nodes 2, 4, 6 and 8 includes a communication circuit 48 for providing serial communications between the nodes through the communication network 10, a microprocessor 50 for processing the communications made through the communication circuit 48, for controlling its own controlled system or object, etc., a power circuit 52 for converting a voltage (normally 10 V to 15 V) produced from a vehicle battery BT to a predetermined source voltage (5 V in the present embodiment) Vcc and supplying it to the communication circuit 48, the microprocessor 50 and the like, and a power control circuit 54 for controlling the supply of power from the power circuit 52 to the communication circuit 48 based on a command issued from the microprocessor 50.

The communication circuit 48 sends transmit data outputted from the microprocessor 50 to the communication network 10 as a transmit signal and outputs an interrupt signal to the microprocessor 50 each time the communication circuit 48 receives a signal sent from the other nodes through the communication network 10 by a predetermined frame. When the microprocessor 50 receives the interrupt signal from the communication circuit 48, the microprocessor 50 reads the data received by the communication circuit 48.

Further, each of the nodes 2, 4, 6 and 8 has two oscillating elements 56a and 56b as elements for generating clocks for activating the microprocessor 50. One oscillating element 56a generates a clock of a frequency (4 MHz in the present embodiment) sufficient for normal operation, whereas the other oscillating element 56b generates a clock of a frequency (30 kHz in the present embodiment) lower than the above frequency. The microprocessor 50 includes two oscillator circuits 58a and 58b for respectively oscillating the oscillating elements 56a and 56b and a selector 60 for activating either one of the oscillator circuits 58a and 58b and outputting a clock obtained from the activated oscillating circuit as an operating clock. Namely, the microprocessor 50 is able to switch its own operating clock to either one of 4 MHz and 30 kHz.

The microprocessor 50 in each of the nodes 2, 4, 6 and 8 constructed in this way activates the oscillating element 56a and the oscillator circuit 58a to operate based on the clock of 4 MHz when the microprocessor 50 is placed in a normal mode for performing a normal operation, and gives a command to the power control circuit 54 so that the source voltage Vcc is supplied from the power circuit 52 to the communication circuit 48. When predetermined conditions to be described later are established, the microprocessor 50 activates the oscillating element 56b and the oscillator circuit 58b to operate based on the clock of 30 kHz thereby to enter into a sleep mode in which power consumption is less provided. Further, the microprocessor 50 gives a command to the power control circuit 54 before entering into the sleep mode to reduce the supply of power from the power circuit 52 to the communication circuit 48.

Accordingly, each of the nodes 2, 4, 6 and 8 is brought into the normal state when the microprocessor 50 is in operation in the normal mode. When the microprocessor 50 enters the sleep mode, the power consumed incident to the operation of the microprocessor 50 is reduced and the supply of the power to the communication circuit 48 is cut off. Therefore, the microprocessor 50 is brought into the sleep state corresponding to a state in which power consumption is extremely low.

A summary of communications made among the respective nodes 2, 4, 6 and 8 under normal conditions and signals transmitted and received thereamong will next be described.

First, as shown in FIGS. 3A–3D, the nodes 2, 4, 6 and 8 respectively periodically transmit signals in predetermined periodic transmit periods or cycles of Ta through Td under normal conditions and send signals when some events have occurred such as state changes in input signals from switches.

The signal transmitted by each of the nodes 2, 4, 6 and 8 has a frame structure shown in FIG. 4. Namely, one frame of the transmit signal is composed of a field SOF indicative of the head of the frame; a field ID indicative of a node name to receive the corresponding frame, the type of corresponding frame or the like; a field DATA indicative of a region for transmitting various data, switch signals and control signals or the like; a field CRC indicative of check data for detecting a communications error; a field ACK for allowing the node having received the corresponding frame to notify the completion of its reception to the node corresponding to the transmitting origin; and a field EOF indicative of the end of the frame.

As indicated by a broken line in FIG. 4, the DATA field in each of the signals transmitted by the nodes 2, 4, 6 and 8 includes a bit (hereinafter called "sleep disable bit") SLNG used as a flag for notifying other nodes that the corresponding node is placed in a state (hereinafter called "sleep disable state") of being unable to enter into the sleep state.

Namely, when the signal from the switch, which has been input to each of the nodes 2, 4, 6 and 8, is placed in a state in which each node has to perform some control and the corresponding node controls an actuator or the like, the node is in the sleep disable state, and hence sets the sleep disable bit SLNG to an active state ("1" in the present embodiment) indicative of the sleep disable state and transmits it therefrom. Otherwise, the node is in a sleep enable state. Thus, the node sets the sleep disable bit SLNG to an inactive state ("0" in the present embodiment) indicative of the sleep enable state.

For example, when the driver's seat door switch 34 is turned on due to the opening of the door on the driver's seat side and the half-open door warning light 44 in the meter panel must be lit, the A node (body ECU) 2 transmits a switch signal indicative of the turning on of the driver's seat door switch 34 while making the sleep disable bit SLNG active, thereby causing the B node (meter ECU) 4 to light the half-open door warning light 44.

In the present embodiment, if the sleep disable bit SLNG sent from each of other nodes is active even if each of the nodes 2, 4, 6 and 8 itself is in the sleep enable state, then the node does not proceed to the sleep state. Further, if each of the nodes 2, 4, 6 and 8 does not continuously receive therein the active sleep disable bits SLNG sent from other nodes for a predetermined period of time or more where each of the nodes 2, 4, 6 and 8 itself is placed in the sleep enable state, it makes the sleep disable bit SLNG inactive and transmits it therefrom, and all the nodes including the corresponding node itself are regarded as having been able to proceed to the sleep state and proceed from the normal state to the sleep state for the first time at that time.

Processes executed by the microprocessor 50 included in each of the nodes 2, 4, 6 and 8 upon transition of the microprocessor to the sleep state will next be described with reference to flowcharts shown in FIGS. 5 and 6.

Figure 5:
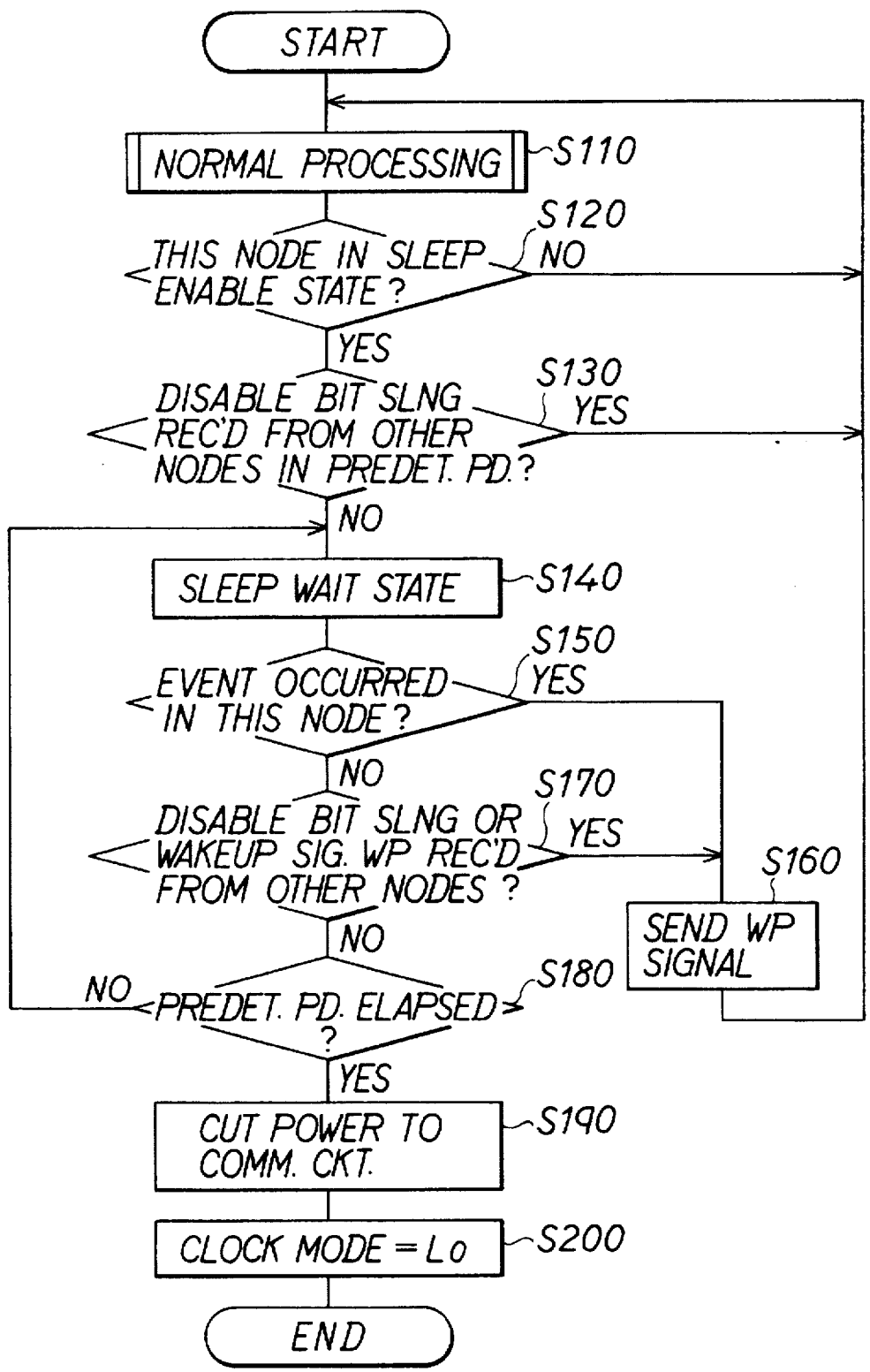
FIG. 5 is a flowchart showing a process executed when a microprocessor at each node enters into a sleep state.

In Step (hereinafter called simply "S") 110 as shown in FIG. 5, the microprocessor 50 in each of the nodes 2, 4, 6 and 8 first executes a normal process for performing the periodic signal transmission and the signal transmission at the time of the occurrence of the event as shown in FIGS. 3A–3D and performing control on its own controlled system or object.

Figure 6:
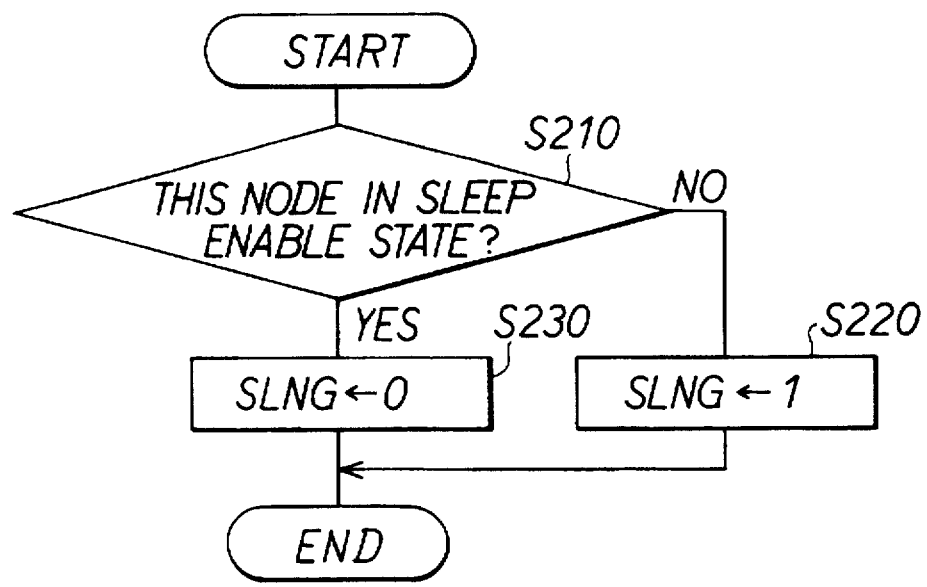
FIG. 6 is a flowchart showing a setting process executed under the execution of the normal process of FIG. 5.

During the normal process, the microprocessor 50 executes a setting process shown in FIG. 6 to thereby set a sleep disable bit SLNG in the signals to be transmitted active or inactive. Namely, it is first determined in S210 whether the node for such a microprocessor 50 itself is in the sleep enable state. If it is determined in S210 that the node is not in the sleep enable state, then the microprocessor 50 proceeds to S220 where the sleep disable bit SLNG is rendered active (set to 1). On the other hand, when the answer is determined to be YES in S210, the microprocessor 50 proceeds to S230 where the sleep disable bit SLNG is made inactive (set to 0).

Once the execution of such a normal process is finished, the microprocessor 50 proceeds to S120 where it makes a decision as to whether its own node is in the sleep enable state. If the answer is determined to be NO in S120, then the microprocessor 50 returns to S110. If the answer is determined to be YES in S120, then the microprocessor 50 proceeds to S130 where it makes a decision as to whether an active sleep disable bit SLNG sent from each of other nodes has been received within a predetermined time interval. If the answer is determined to be YES in S130, then the microprocessor 50 goes back to S110.

Incidentally, the predetermined time interval determined in S130 is set to a time interval in which it is estimated that all the nodes other than the corresponding node will perform signal transmission once. In the present embodiment, the periodic transmit cycles Tb, Tc and Td of the B node 4, C node 6 and D node 8 are all equal to each other and only the periodic transmit cycle Ta of the A node 2 is set shorter than others as shown in FIGS. 3A–3D. Therefore, the above-described predetermined time interval is set to a value larger than each of the periodic transmit cycles Tb through Td of the B node 4 through D node 8.

On the other hand, if it is determined in S130 that the active sleep disable bit SLNG sent from each of other nodes has not been received within the predetermined time interval, then the microprocessor 50 determines that all the nodes including its own node have been brought into the sleep enable state and proceeds to S140 where it shifts to a sleep waiting state in which the periodic transmission is stopped and only the receive operation is performed.

When the microprocessor 50 enters into the sleep waiting state, it determines in S150 whether events (i.e., a change of state of each switch, etc.) have occurred in its own node. If the answer is determined to be YES in S150, then the microprocessor proceeds to S160 where it transmits a wakeup signal WP for notifying the resetting of itself to the normal state to other nodes and thereafter returns to S110 where the execution of the normal process is resumed.

Incidentally, the wakeup signal WP is disposed within the ID field shown in FIG. 4, for example, and transmitted. The wakeup signal WP does not influence a node that is performing the normal operation but has the function of allowing a node placed in the sleep waiting state or sleep state to perform the normal operation. In S160, the sleep disable bit SLNG may be rendered active and transmitted as an alternative to the wakeup signal WP.

On the other hand, when the answer is found to be NO in S150, the microprocessor 50 proceeds to S170 where it is determined whether an active sleep disable bit SLNG sent from each of other nodes or the wakeup signal WP sent from each of other nodes has been received. Even when it is determined in S170 that either one of them has been received, the microprocessor 50 proceeds to S160 where the wakeup signal WP is transmitted. Thereafter, the microprocessor 50 returns to S110 where it resumes the execution of the normal process.

If it is determined in S170 that both of the active sleep disable bit SLNG and the wakeup signal WP have not been received, then the microprocessor 50 proceeds to S180 where it shifts to the sleep waiting state and determines whether a predetermined time interval has elapsed. If the answer is found to be NO in S180, then the microprocessor 50 returns to S140, whereas if the answer is found to be YES in S180, it proceeds to S190.

In S190, the microprocessor 50 instructs the power control circuit 54 to reduce the supply of the power to the communication circuit 48. In S200, the microprocessor 50 deactivates the oscillating element 56a and the oscillator circuit 56a which have been oscillating up to that point, and activates the oscillating element 56b and the oscillating circuit 58b in place of them. As a result, the microprocessor 50 enters into a sleep mode in which it is activated based on the clock (clock mode=Lo) of 30 kHz which is lower in frequency than the normal state. Thus, the corresponding node is brought into the sleep state.

In the present embodiment, the processes in S120, S150 and S210 correspond to a process which functions as a sleep determining means, the process in S220 corresponds to a process which functions as a notifying or signaling means, and the processes in S130, S140 and S170 through S200 correspond to a process which functions as a switching means.

Namely, the multiplex communication system 1 according to the present embodiment determines (in S120 and S210) whether each of the nodes 2, 4, 6 and 8 is in the sleep enable state. If it is determined that each node is not in the sleep enable state (i.e., if the answer is found to be NO in S120 and S210), then the node makes the sleep disable bit SLNG active and transmits it therefrom (S220) to thereby notify its own sleep disable state to all the other nodes.

When each of the nodes 2, 4, 6 and 8 itself reaches the sleep enable state (i.e., if the answer is found to be YES in S120 and S210), the node stops the transmission of the active sleep disable bit SLNG (S230). If it is determined that the active sleep disable bit SLNG sent from each of other nodes has not been received continuously for the predetermined time interval or more (i.e., if the answer is found to be NO in S130), then all the nodes including the corresponding node are determined to have been brought into the sleep enable state and proceed to the sleep waiting state. Thereafter, the operating state of the corresponding node is switched to the sleep state (S190 and S200).

A tester or the like for checking each node and the state of communications cannot determine or detect whether other nodes are in the sleep waiting state or in the sleep state or they are not under transmission due to the absence of a signal to be transmitted even though they are in the normal state. Therefore, in order to cause other nodes to determine when the operating state is shifted to another state, a signal for notifying a shift to the sleep waiting state and a signal for notifying a shift to the sleep state are determined in advance. Further, the signals may be respectively transmitted when it is determined in S130 that the predetermined time interval has elapsed and the microprocessor 50 proceeds to S140 and when it is determined in S180 that the predetermined time interval has elapsed and the microprocessor 50 proceeds to S190.

According to the multiplex communication system 1 of this embodiment, the nodes 2, 4, 6 and 8 can mutually check, based on the decision that the active sleep disable bits SLNG have not been sent from other nodes, whether they have been brought into the sleep enable state. Therefore, each node can be reliably shifted to the sleep state without discriminating between communicable nodes and the need for a complex determining process as in the above-described conventional system even if nodes capable of performing transmit operations due to failures or the like exist. Accordingly, a vehicle prone to having dead batteries can reliably reduce power to be used up by the battery BT.

In the multiplex communication system 1 according to the present embodiment as well, since the supply of the power from the power circuit 52 to the communication circuit 48 is cut off when the individual nodes 2, 4, 6 and 8 enter into the sleep state, power consumption can be further reduced.

Further, according to the multiplex communication system 1, since each of the nodes 2, 4, 6 and 8 is constructed to proceed to the sleep state by simply determining that no active sleep disable bits SLNG are sent from other nodes, nodes can be additionally provided without a change in determining process for shifting to the sleep state and hence the system has excellent expandability.

Moreover, in the multiplex communication system 1, when all the nodes enter into the sleep enable state (i.e., when the answer is determined as negative in S130), they first proceed to the sleep waiting state without immediately entering into the sleep state and then execute the processes of S140 through S180. Thus, each node enters into the sleep state after it is confirmed that the node is in the sleep enable state and the state in which the sleep disable bits SLNG are not sent from other nodes continue over the predetermined time interval. Therefore, the multiplex communication system according to the present embodiment can more reliably determine whether each node should shift to the sleep state.

On the other hand, when each of the nodes 2, 4, 6 and 8 in the multiplex communication system 1 according to the present embodiment is brought into the sleep state as described above, i.e., when the microprocessor 50 enters into the sleep mode, the microprocessor 50 is activated based on the slow clock of 30 kHz to detect the state of the signal directly inputted from each switch or the like and the state of the communication network 10. When the microprocessor 50 detects changes in the states, the microprocessor 50 starts (wakes up) the entire system.

A process executed by the microprocessor 50 included in each of the nodes 2, 4, 6 and 8 upon transition of the microprocessor 50 to the sleep mode will next be described with reference to a flowchart shown in FIG. 7.

Figure 7:
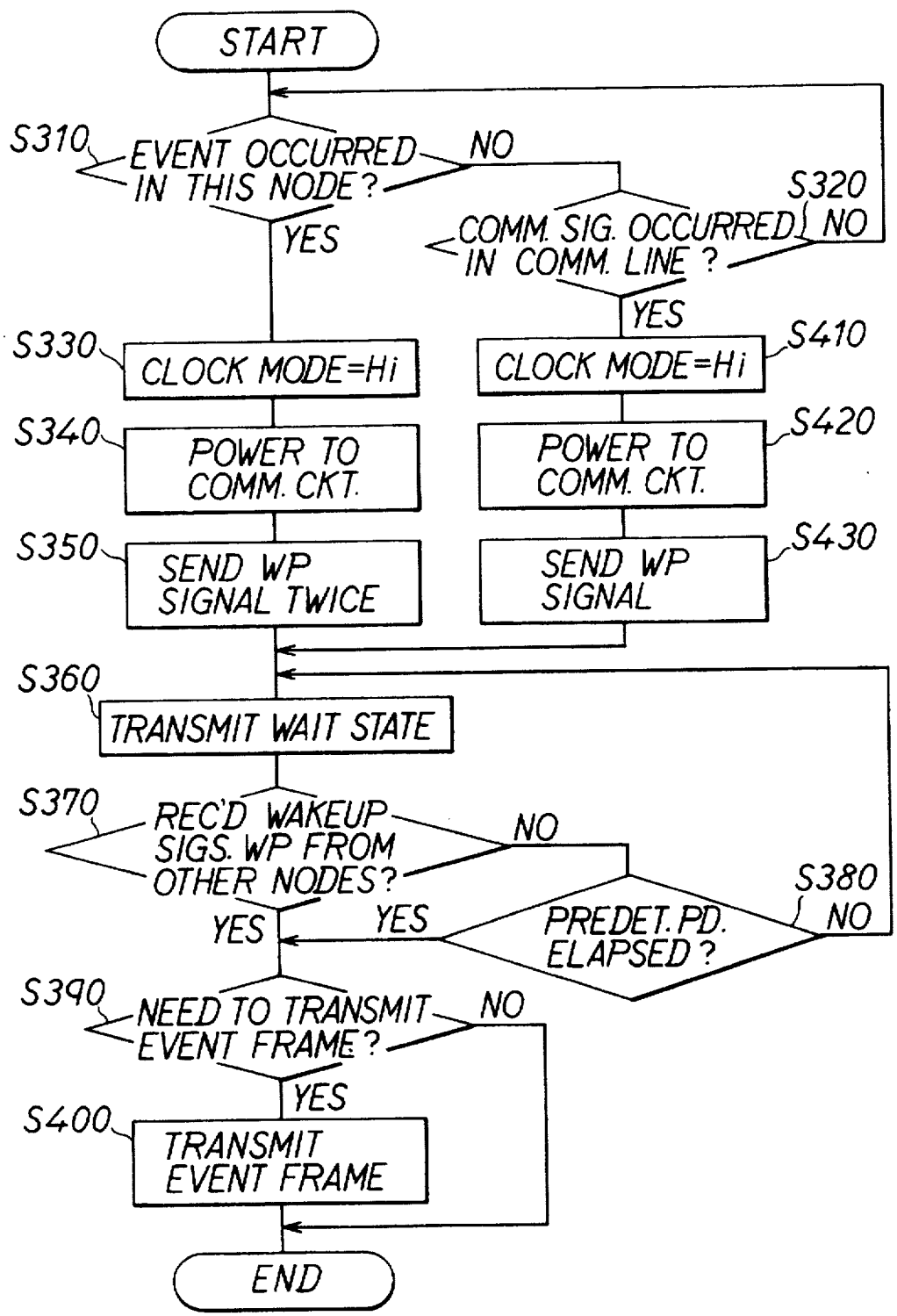
FIG. 7 is a flowchart showing a process executed when a microprocessor is in a sleep mode according to the embodiment.

When each individual node 2, 4, 6 or 8 enters into a sleep state as shown in FIG. 7, the microprocessor 50 first determines in S310 whether an event (i.e., a change of state of each switch or the like other than the communication network 10) has occurred in its own node. If the answer is found to be NO in S310, then the microprocessor 50 proceeds to S320 where it is determined whether a communication signal is produced in the communication network 10. If it is determined in S320 that the communication signal has not been produced, then the microprocessor 50 returns to S310.

On the other hand, if the microprocessor 50 determines that the event has occurred in its own node, then the microprocessor 50 proceeds to S330 where it deactivates the oscillating element 56b and the oscillator circuit 58b which have been oscillating up to this point and activates the oscillating element 56a and the oscillator circuit 58a in place of them. As a result, the microprocessor 50 starts operating based on the clock (clock mode=Hi) of 4 MHz for the normal operation.

In S340, the microprocessor 50 instructs the power control circuit 54 to supply the source voltage Vcc from the power circuit 52 to the communication circuit 48, thereby returning the corresponding node to the communicable normal state.

Further, the microprocessor 50 sends the above-described wakeup signal WP twice in S350 to return other nodes from the sleep state to the normal state. The first wakeup signal WP transmitted in S350 serves to shift all other nodes from the sleep state to a receivable state. The second wakeup signal WP serves to notify a receivable state of the node of the microprocessor 50 to the nodes brought into the receivable state by the first wakeup signal WP.

When the process in S350 is executed, the microprocessor 50 proceeds to S360 where it enters into a transmit waiting state in which only the receive operation is performed. The first wakeup signal WP of the wakeup signals WP transmitted twice in S350 is detected by the process in S320 at other nodes. Other nodes transmit the wakeup signals WP as will be described later. Therefore, when the microprocessor is in the transmit waiting state, the microprocessor 50 first determines in S370 whether wakeup signals WP sent from all the nodes other than its own node have been received. If the answer is found to be NO in S370, then the microprocessor 50 proceeds to S380 where it is determined whether a predetermined time interval has elapsed since it has entered into the transmit waiting state. If the answer is found to be NO in S380, then the microprocessor 50 returns to S360.

The communication circuit 48 starts operating from the time when supplied with the source voltage Vcc and outputs an interrupt signal to the microprocessor 50 each time the communication circuit 48 receives therein the signal sent from each of other nodes by the predetermined frame, as already described above. Since the microprocessor 50 reads the received data from the communication circuit 48 when the microprocessor 50 receives the interrupt signal from the communication circuit 48, the operation for receiving the wakeup signals WP from other nodes can be done immediately after the supply of the source voltage Vcc to the communication circuit 48. Thus, the process in S370 makes a decision, based on the received data read as described above and sent from the communication circuit 48, as to whether or not the wakeup signal WP has been sent from any of the nodes.

If it is determined in S370 that the wakeup signals WP have been received from all other nodes, or if it is determined in S380 that the predetermined time interval has elapsed, then the routine procedure proceeds to S390 where it is determined whether it is necessary to transmit an event frame with a switch signal or the like disposed therein to the DATA frame shown in FIG. 4. If the answer is found to be YES in S390, then the execution of the normal process (S110) is resumed in S400 after transmission of the event frame. If the answer is found to be NO in S390, then the execution of the normal process is resumed as it is.

On the other hand, if it is determined in S320 that the communication signal has been produced in the communication network 10, i.e., if the wakeup signal WP (the first wakeup signal WP obtained in S350) sent from another node is detected when the corresponding node is in the sleep state, then the routine procedure proceeds to S410 where the microprocessor 50 activates the oscillating element 56a and the oscillator circuit 58a exactly in the same manner as S330 to start operating based on the clock (clock mode=Hi) of 4 MHz for the normal operation. In S420, the microprocessor 50 instructs the power control circuit 54 to supply the source voltage Vcc from the power circuit 52 to the communication circuit 48. Thus, in this case, the corresponding node is returned to the communicable normal state at the time that the process in S420 has been finished.

In S430, the microprocessor 50 transmits the wakeup signal WP to notify its own startup to other nodes, followed by proceeding to S360 where the above-described processes (S360 through S400) are executed and thereafter the execution of the normal process (S110) is resumed.

In the present embodiment, the process in S310 corresponds to a process which serves as a start condition determining means, and the processes in S330 through S350 correspond to a process which functions as a first starting means. Further, the process in S320 corresponds to a process which serves as a start signal detecting means, the processes in S410 through S430 correspond to a process which functions as a second starting means, and the processes in S360 through S380 correspond to a process which works as a transmit permitting means.

In the multiplex communication system 1 according to this embodiment for executing the processing shown in FIG. 7, when it is determined by the process in S310 that the event has occurred in any of the nodes while all the nodes 2, 4, 6 and 8 are in the sleep state, the corresponding node (hereinafter called "start node") is returned from the sleep state in which the microprocessor operates based on the low-speed clock of 30 kHz to the normal state in which the microprocessor operates based on the high-speed clock of 4 MHz in accordance with the processes of S330 to S350 and transmits the wakeup signal WP used as a start signal twice.

In doing so, each of other nodes other than the start node detects the first wakeup signal WP of the wakeup signals WP transmitted twice as described above in accordance with the process in S320. Correspondingly, each of the nodes other than the start node is returned from the sleep state to the normal state in accordance with the processes of S410 to S430 and the corresponding node itself transmits the wakeup signal WP.

All the nodes including the start node are returned from the sleep state to the normal state as described above and thereafter temporarily enter into the transmit waiting state in which only the receive operation is performed. If it is determined based on the processes of S360 through S380 that the wakeup signals WP sent from all the nodes other than the corresponding node itself have been received or that the predetermined time interval has elapsed, it is determined that all the nodes have been brought into the receivable state (transmit waiting state). Thus, the operation of transmission of a desired signal from the corresponding node is allowed and the desired signal (event frame) is transmitted if necessary in accordance with the processes in S390 and S400.

Since each of the nodes other than the start node is returned from the sleep state to the normal state in response to the first wakeup signal WP sent from the start node, there is a possibility that the first wakeup signal WP cannot be received by the node due to its return delay. Even in such a case, each of the nodes other than the start node reliably receives the second wakeup signal WP sent from the start node, thereby making it possible to detect that the start node is in the receivable state (transmit waiting state).

On the other hand, the node, i.e., start node that has detected the change of state of the switch (the occurrence of the event) in S310 to start the entire system, transmits a switch signal indicative of the change of state of the switch in the form of the event frame. During the process of resuming the normal process from the sleep state, each of other nodes started up by the start node transmits the event frame in S400 when data to be transmitted is produced due to the change of state of the switch or the like, which has been input thereto.

Operation based on the execution of the processes shown in FIG. 7 will now be described with reference to FIGS. 8A–10D by taking as an example the case in which the driver's seat door is opened when all the nodes 2, 4, 6 and 8 are respectively in the sleep state.

When the driver's seat door is open, the driver's seat door switch 34 changes from an off to an on state as shown in FIG. 8A. In doing so, the A node (body ECU) 2 detects its change (i.e., the answer is found to be YES in S310) and the operating clock of the microprocessor 50 is switched from the low-speed clock (on-sleep mode clock) of 30 kHz to the high-speed clock (on-normal mode clock) of 4 MHz. Further, the source voltage Vcc is supplied to the communication circuit 48. As a result, the A node 2 is returned to the communicable normal state (S330 and S340). Next, the A node 2 transmits the wakeup signal WP to the communication network 10 (transmission line) twice to start up other nodes 4, 6 and 8 (S350).

The signal sent through the driver's seat door switch 34 is inputted to an input port of the microprocessor 50 of the A node 2. Further, the microprocessor 50 of the A node 2 samples the signal inputted to the input port thereof in a predetermined cycle as indicated by upward arrows in FIG. 8C to thereby detect the change of state of the driver's seat door switch 34.

Thus, when the wakeup signal WP is transmitted twice from the A node 2, the nodes 4, 6 and 8 other than the A node 2 first detect the first wakeup signal WP sent from the A node 2 (i.e., the answer is found to be YES in S320) as shown in FIGS. 9A–9D. In doing so, the operating clock of the microprocessor 50 in each of the nodes 4, 6 and 8 is switched from the on-sleep mode clock to the on-normal mode clock and the source voltage Vcc is supplied to the communication circuit 48. As a result, the individual nodes 4, 6 and 8 other than the A node 2 are also returned to the communicable normal state (S410 and S420).

When each of the nodes 2, 4, 6 and 8 is kept in the sleep state in the present embodiment, the microprocessor 50 monitors a change in the level of the communication network 10 through the normal input port thereof. Upward arrows in FIGS. 9C show sampling timing provided to detect the change in the level of the communication network 10 by the microprocessor 50.

The nodes 4, 6 and 8, which have been returned to the normal state by the first wakeup signal WP sent from the A node 2, respectively receive therein the second wakeup signal WP sent from the A node 2 as shown in FIGS. 10A–10D and respectively transmit wakeup signals WP indicative of their startups to the communication network 10 (S430).

In doing so, the A node 2 receives therein the respective wakeup signals WP sent from other nodes 4, 6 and 8 and other nodes 4, 6 and 8 also respectively receive therein respective wakeup signals WP sent from nodes other than themselves. As a result, the respective nodes 2, 4, 6 and 8 determine that all the nodes constituting the system have been brought into a receivable state (i.e., the answer is found to be YES in S370).

In the present embodiment, only the A node 2 determines as necessary to transmit an event frame (i.e., the answer is found to be YES in S390) and transmits an event frame including the "D-seat door opening" field in FIG. 10A) indicative of the turning on of the driver's seat door switch 34 (S400). In doing so, the B node (meter ECU) 4 receives therein the event frame sent from the A node 2 to turn on the half-open door warning light 44 in the meter panel.

Incidentally, an arrow indicated at a time t1 in FIG. 10A shows timing in which the driver's seat door is opened.

In the multiplex communication system 1 according to the present embodiment as described above, the node (start node) which has determined that the event for starting the corresponding system has occurred is first returned from the sleep state to the normal state and transmits the wakeup signal WP therefrom twice. Further, the node returns all the other nodes from the sleep state to the normal state based on the first wakeup signal WP of the twice-transmitted wakeup signals WP. When the respective nodes other than the start node are also returned to the normal state, they send the wakeup signals WP respectively. When all the nodes including the start node all receive therein the wakeup signals WP sent from other nodes other than themselves, it is determined that all the nodes have been returned to the normal state, and the operation of transmission of the desired signals is started.

Thus, according to the multiplex communication system 1 having a simple structure as in this embodiment, as described above, each node can reliably proceed to the sleep state. Further, when the individual nodes restart from the sleep state, the respective nodes 2, 4, 6 and 8 start to transmit the desired signals after having confirmed that all the nodes have completely been returned to the normal state. Therefore, when the individual nodes restart from the sleep state, they can reliably communicate with one another without missing reception of the communication signals.

Also, in the multiplex communication system 1 of this embodiment, the node (start node) firstly returned from the sleep state to the normal state transmits the wakeup signal WP twice. Therefore, other nodes can reliably receive the second wakeup signal WP even if they cannot receive the first wakeup signal WP sent from the start node. Thus, all the nodes 2, 4, 6 and 8 can reliably check or detect that they have been returned to the normal state, to be able to start the transmission of the desired signals.

Further, in the multiplex communication system 1 according to this embodiment, even when the respective nodes cannot receive the wakeup signals WP sent from all other nodes after their own operating states have been changed from the sleep state to the normal state respectively, the operation of transmission of the desired signals from its own nodes is permitted after elapse of the predetermined time interval (i.e., the answer is found to be YES in S380).

Thus, according to the multiplex communication system 1 of this embodiment, since the operation of transmission of desired signals from other nodes is allowed even if any node cannot transmit the wakeup signal WP due to its failure or the like, it is possible to ensure communications made between the normal nodes.

In the above-described embodiment, when each of the nodes 2, 4, 6 and 8 is kept in the sleep state, the microprocessor 50 is activated based on the clock (30 kHz) whose frequency is low and detects the change of state of the switch or the communication network 10 through its normal input port. However, the microprocessor 50 may be constructed to stop its operating clock when each node is in the sleep state. In this case, when the state of the communication network 10 or the signal sent from the switch changes, each node may be set to return to the normal state by externally interrupting the microprocessor 50.

Alternatively, even when the two kinds of operating clocks are used, each node may be returned from the sleep state to the normal state by externally interrupting the microprocessor when the state of the switch or the communication network 10 changes.

Even when the power control circuit 54 for supplying the power to the communication circuit 48 is omitted, current consumption at the time of the sleep state can be reduced by a reduction in the frequency of the operating clock. However, this arrangement does not produce a current-consumption reducing effect of the extent obtained by stopping the supply of the power from the communication circuit 48 to the power circuit 52.

The multiplex communication system 1 according to the above-described embodiment has been described in detail in connection with the case in which all the nodes are able to proceed to the sleep state. However, the multiplex communication system 1 is not necessarily limited to this arrangement. For example, the multiplex communication system 1 may be constructed by connecting nodes or the like (corresponding to nodes configured to be unable to proceed to the sleep state) activated only when a normally-operated node or an ignition key is operated. In this case, the communications similar to the aforementioned embodiment are made between the nodes constructed to be able to shift to the sleep state.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A node for a multiplex communication system in which a plurality of nodes connected to one another through a communication network are capable of mutually transmitting and receiving signals, said node comprising:

sleep determining means for determining whether an operating state of said node is permitted to shift from a normal state to a sleep state having less power consumption than said normal state;

a communication circuit for transmitting signals from said node and for receiving signals sent to said node, said communication circuit including notifying means for transmitting signaling signals representative of a non-sleep enabled state of said node to other nodes responsive to a determination by said sleep determining means that said node is not permitted to shift to said sleep state, and receiving means for receiving signaling signals from other nodes;

reception timing means for measuring a continuous time period during which said receiving means does not receive said signaling signals sent from other nodes; and switching means for, responsive to a determination by said sleep determining means that said node is permitted to shift to said sleep state, switching said operating state of said node to a sleep state when said time period measured by said reception timing means exceeds a predetermined value.

2. The node of claim 1, wherein:
   said sleep state is a sleep waiting state;
   said switching means is further for, when said node is in said sleep waiting state, switching said operating state of said node to a sleep enable state when said time period measured by said timing means exceeds a predetermined value.

3. The node of claim 2, further comprising:
   start condition determining means for determining whether predetermined start conditions for starting said system have been established when said node is in said sleep state; and first starting means for switching said operating state of the corresponding node from said sleep state to said normal state when said start condition determining means determines that said start conditions have been established and transmitting twice a start signal for notifying a startup of said node to other nodes in said system;

start signal detecting means for detecting that a start signal has been transmitted from another node when said node is in said sleep state;

second starting means for switching said operating state of said node from said sleep state to said normal state to transmit said start signal when transmission of a start signal is detected by said start signal detecting means; and transmit permitting means for permitting transmission of a desired signal from said node when said node has received start signals sent from other nodes after said operating state of said node has been switched from said sleep state to said normal state.

4. The node of claim 3, wherein said transmit permitting means is for permitting transmission of said desired signal from said node regardless of conditions of start signals received from other nodes when said predetermined time interval has elapsed after said operating state of said corresponding node has been changed from said sleep state to said normal state.

5. The node of claim 1, wherein said start signal has a format different from said signaling signals.

6. The node of claim 1, further comprising:
   start condition determining means for determining whether predetermined start conditions for starting said system have been established when said node is in said sleep state; and first starting means for switching said operating state of said corresponding node from said sleep state to said normal state when said start condition determining means determines that said start conditions have been established and transmitting twice a start signal for notifying a startup of said node to other nodes in said system;

start signal detecting means for detecting that a start signal has been transmitted from another node when said node is in said sleep state;

second starting means for switching said operating state of said node from said sleep state to said normal state to transmit said start signal when transmission of a start signal is detected by said start signal detecting means; and transmit permitting means for permitting transmission of a desired signal from said node when said node has received start signals sent from other nodes after said operating state of said node has been switched from said sleep state to said normal state.

7. The node of claim 6, wherein said transmit permitting means is for permitting transmission of said desired signal from said node regardless of conditions of start signals received from other nodes when said predetermined time interval has elapsed after said operating state of said corresponding node has been changed from said sleep state to said normal state.

8. The node of claim 6, wherein said start signal has a format different from said signaling signals.

9. The node of claim 1 wherein said each node is a control device for controlling a respective portion of a vehicle.

10. The node of claim 1, further comprising power supply termination means for reducing supply of power to said communication circuit responsive to switching said operative state of said node to said sleep state by said switching means.

11. The node of claim 1, wherein said predetermined value corresponds to a time period sufficient for all other nodes in said system to transmit a signaling signal.

12. The node of claim 1, wherein said comunication circuit is for transmitting control signals to other nodes in said system, said control signals including said signaling signal.

13. The node of claim 1, wherein said sleep state is a sleep waiting state in which said node is capable of receiving signals but no signals are transmitted.

* * * * *